United States Patent
Park et al.

[19]

[11] Patent Number: 6,127,952
[45] Date of Patent: Oct. 3, 2000

[54] VIDEO DATA RECORDING APPARATUS

[75] Inventors: Seong Mo Park; Jin Jong Cha; Kyung Soo Kim, all of Daejeon, Rep. of Korea

[73] Assignee: Electronics and Telecommunications Research Institute, Daejeon, Rep. of Korea

[21] Appl. No.: 09/136,733

[22] Filed: Aug. 19, 1998

[30] Foreign Application Priority Data

Nov. 12, 1997 [KR] Rep. of Korea ............... 97-59537

[51] Int. Cl.$^7$ .................... H03M 7/46; H03M 7/00
[52] U.S. Cl. ............................... 341/63; 341/59
[58] Field of Search ............... 341/59, 58, 63, 341/67, 65, 60; 348/403, 384

[56] References Cited

U.S. PATENT DOCUMENTS

| | | | |
|---|---|---|---|
| 4,207,599 | 6/1980 | Murayama et al. | 341/63 |
| 4,499,498 | 2/1985 | Iinuma | 341/63 |
| 4,626,829 | 12/1986 | Hauck | 341/63 |
| 5,614,953 | 3/1997 | Kim | 348/403 |
| 5,649,077 | 7/1997 | On et al. | 395/119 |

*Primary Examiner*—Michael Tokar
*Assistant Examiner*—Peguy JeanPierre
*Attorney, Agent, or Firm*—Jacobson, Price, Holman & Stern, PLLC

[57] ABSTRACT

A video data run length decoding apparatus is disclosed. The aparatus includes a run length decoder for analyzing a run value of a coded video data, generating a run value, and alternately outputting an interval of a 8-clock signal in which there is a data and another interval of a 8-clock signal in which there is not a data using a gap clock signal, a reverse zig zag and dequantizer for processing a data from the run length decoder based on the reverse zig zag and dequantization operation, and a reverse discrete cosine converter for processing a data outputted from the reverse zig zag and dequantizer, two times, based on the reverse discrete cosine conversion and outputting a two-dimensional video data, thereby decreasing the number of gates of a decoding apparatus and implementing a high speed system by alternately outputting an interval in which there is a data and another interval in which there is not a data using a gap clock signal generator in a run length decoder for a video data run length decoding apparatus.

8 Claims, 5 Drawing Sheets

VIDEO DATA RECORDING APPARATUS

BACKGROUND OF THE INVENTION

1. Field of the Invention

The present invention relates to a video data run length decoding apparatus, and in particular, to an improved video data run length decoding apparatus which is capable of effectively decoding a coded video data and generating a data stream using a run length of the video data.

2. Description of the Conventional Art

Generally, the video data coding technique is directed to coding and decoding video data using their run lengths. Here, the "run" represents a zero data. When a video data is discrete cosine-converted and then quantized, an original video data is converted to a zero data. At this time, consecutive zero values correspond to the number of run values. For example, if the value of a video data is 0000001, the number of the run is 6. The run length of the data to be transmitted is 61. Therefore, the number of the zero values is computed, and then only the value corresponding to the number of the same is transmitted for thereby implementing a predetermined coding effect. With the above-described coding method, the coding effect is enhanced, and the original data is not lost for thereby obtaining a good quality of the picture. The coded data is expressed by the number of the run data and the level of the same.

The value of the run is counted when coding video data and then only the number of the run data is transmitted for thereby enhancing a coding effect. When decoding the data, the data is decoded to the data having its original run value. At this time, the data is decoded by the unit of the 64 blocks.

In the run length decoding block of the conventional decoding apparatus, the coded video data is decoded to its original video data by a reverse zig zag and dequantizer and a reverse discrete cosine converter. At this time, the decoded video data should maintain a predetermined video stream based on a pipeline operation. The coded video data is consecutively computed on the pipeline. A buffer is used for storing the data because there is a difference in the data processing speed of a clock signal.

Figure 1:
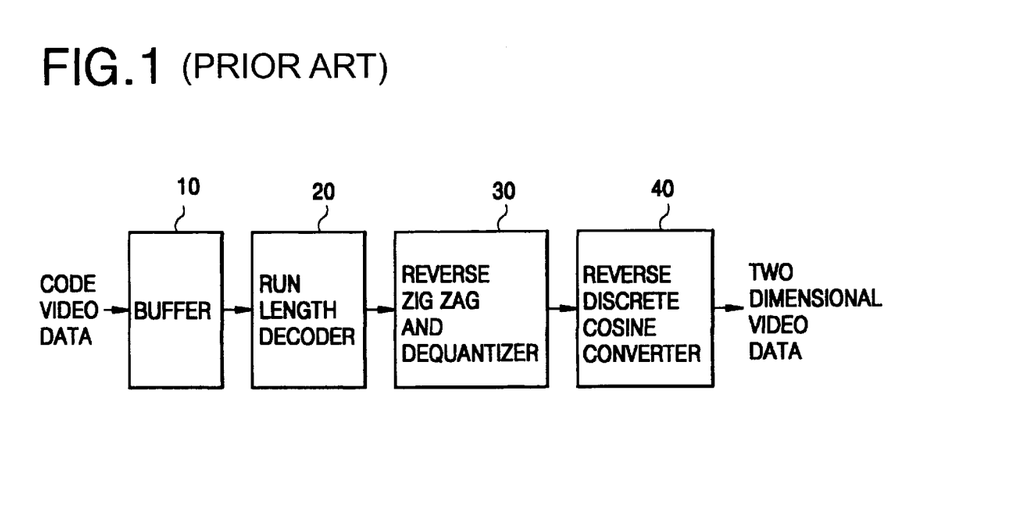
FIG. 1 is a block diagram illustrating a conventional video run data run length decoding apparatus.

FIG. 1 illustrates the construction of a conventional video data run length decoding apparatus which includes a buffer 10 for storing a coded video data and alternately generating an interval in which there is a data and another interval in which there is not data, a decoder 20 for analyzing the run value of a video data outputted from the buffer 10 and generating a run value, a reverse zig zag and dequantizer 30 for processing the run value outputted from the run length decoder 20 based on the reverse zig zag and dequantizing method, and a reverse discrete cosine converter 40 for processing, two times, the data outputted from the reverse zig zag and dequantizing unit 30 based on the reverse discrete cosine conversion method and decoding the thusly converted data into a 2-dimensional video data.

The operation of the conventional decoding apparatus will be explained with reference to FIG. 1.

First, the buffer 10 receives coded video data and stores the same and then alternately generates an interval in which there is a data and another interval in which there is not a data. The run length decoder 20 analyzes the run value of the video data and generates a run value. The reverse zig zag and dequantizer 30 process the data outputted from the run length decoder 20 based on the reverse zig zag and dequantization operation. The reverse discrete cosine converter 40 processes the data outputted from the reverse zig zag and dequantizer 30 based on the reverse discrete cosine conversion for thereby obtaining a one-dimensional video data and then converts the one-dimensional video data based on the reverse discrete cosine conversion and the two-dimensional video data, respectively. The buffer 10 stores the coded data for implementing a process delay time which is required for converting the one-dimensional video data into a two-dimensional video data and then alternately outputs an interval in which there is a 8-clock signal data and another interval in which there is not a 8-clock signal data by the 8-clock signal unit. In the interval in which there is 8 data, the one-dimensional cosine conversion is performed for thereby obtaining a one-dimensional video data, and in the interval in which there is not 8 data, the one-dimensional video data which is processed by a pre-memory is processed based on the two-dimensional discrete cosine conversion for thereby obtaining a two-dimensional video data. According the standard recommendation such as H.263, the above-described operation is implemented based on the 8×8 pixel unit as a basic block. In addition, in order to efficiently implement the hardware, the two-dimensional discrete cosine conversion is computed by using twice the reverse discrete cosine converter 40.

As described above, in the conventional video data run length decoding apparatus, when decoding the coded video data, the buffer (memory) is required for storing the coded data inputted for implementing a predetermined processing delay time which is required for converting the one-dimensional video data into the two-dimensional video data using the reverse discrete cosine converter. Therefore, the layout area is increased due to the memory and an additional control circuit. There is a limit for implementing a high speed system.

SUMMARY OF THE INVENTION

Accordingly, it is an object of the present invention to provide a video data run length decoding apparatus which overcomes the aforementioned problems encountered in the conventional art.

It is another object of the present invention to provide a video data run length decoding apparatus which is capable of decreasing the number of gates of a decoding apparatus and implementing a high speed system by alternately outputting an interval in which there is a data and another interval in which there is not a data by introducing a gap clock signal generator in a run length decoder for a video data run length decoding apparatus.

In order to achieve the above objects, there is provided a video data run length decoding apparatus which includes a run length decoder for analyzing a run value of a coded video data, generating a run value, and alternately outputting an interval of a 8-clock signal in which there is a data and another interval of a 8-clock signal in which there is not a data using a gap clock signal, a reverse zig zag and dequantizer for processing a data from the run length decoder based on the reverse zig zag and dequantization operation, and a reverse discrete cosine converter for processing a data outputted from the reverse zig zag and dequantizer, two times, based on the reverse discrete cosine conversion and outputting a two-dimensional video data.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
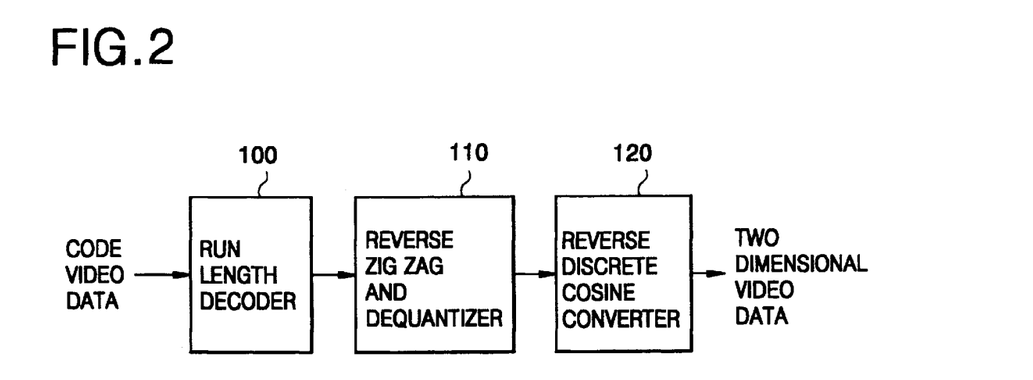
FIG. 2 is a block diagram illustrating a video run data run length decoding apparatus according to the present invention.

FIG. 2 illustrates a video data run length decoding apparatus according to the present invention which includes a run length decoder 100 for analyzing a run value of a video data and alternately outputting a 8-clock signal interval in which there is a data and another 8-clock signal interval in which there is not a data using a gap clock signal, a reverse zig zag and dequantizer 110 for processing the data outputted from the run length decoder 100 based on the reverse zig zag and dequantization operation, and a reverse discrete cosine converter 120 for twice-processing the output outputted from the reverse zig zag and dequantizer 110 based on the reverse discrete cosine conversion and then outputting a two-dimensional video data.

The operation of the decoding apparatus according to the present invention will be explained with reference to the accompanying drawings.

Fist, the run length decoder 100 receives a coded data which is expressed based on the number of run data and levels, analyzes the run value of the video data, generates the run value and alternately outputs a 8-clock signal interval in which there is a data and another 8-clock signal interval in which there is not a data using a gap clock signal. The reverse zig zag and dequantizer 110 processes the data outputted from the run length decoder 100 based on the reverse zig zag and dequantization. The reverse discrete cosine converter 120 twice-processes the data outputted from the reverse zig zag and dequantizer 110 based on the reverse discrete cosine conversion for thereby outputting a two-dimensional video data.

Figure 3:
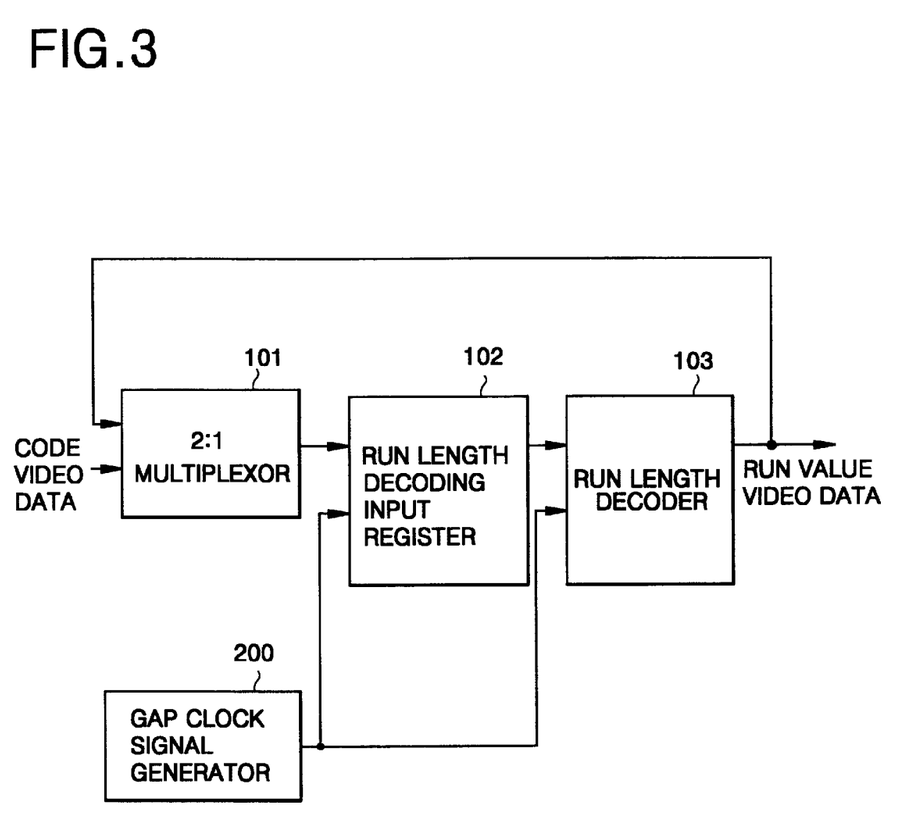
FIG. 3 is a block diagram illustrating a detailed construction of the video data run length decoding apparatus of FIG. 2.

FIG. 3 illustrates the run length decoder of FIG. 2 which includes a 2:1 multiplexor 101 for preventing a new data from being inputted while a run data having variable values 0 through 63 is being analyzed, a gap clock signal generator 200 for generating a gap clock signal, a decoding input register 102 for generating a data stream on the pipeline based on the condition that the data outputted from the 2:1 multiplexor 101 is inputted in the 8-clock signal interval and the same is not inputted in the next 8-clock signal interval using a gap clock signal from the gap clock signal generator 200, and a run length decoder 103 for analyzing a run value of a data stream on the pipeline outputted from the run length decoding input register 102 and generating a run value based on the gap clock signal from the gap clock signal generator as a basic clock signal.

The operation of the run length decoder 100 will be explained.

The 2:1 multiplexor 101 prevents a new data from being inputted until a run value is analyzed and generated by the run length decoder 103 and receives a data when the run value is processed by the run length decoder 103. In addition, the 2:1 multiplexor 101 receives an input from the run length decoder 103 for generating a data stream which is used for the reverse discrete cosine converter 120.

The gap clock signal generator 200 generates a gap clock signal and outputs the thusly generated gap clock signal to the decoding input register 102 and the run length decoder 103, respectively, for thereby maintaining a data stream on the pipeline which is configured so that an interval in which there is a data and another interval in which there is not a data are alternately formed. The run length decoding input register 102 generates a data stream on the pipeline so that the data is inputted in the 8-clock signal interval and the data is not inputted in the next 8-clock signal interval using a gap clock signal from the gap clock signal generator 200. The run length decoder 103 analyzes a run value of a data stream on the pipeline outputted from the run length decoder 103 using the gap clock signal from the gap clock signal generator as a basic clock signal and then outputs a run value. Here, the run value has variable values 0 through 63. When the run value has more than 0, the zero value is generated.

Figure 4A:
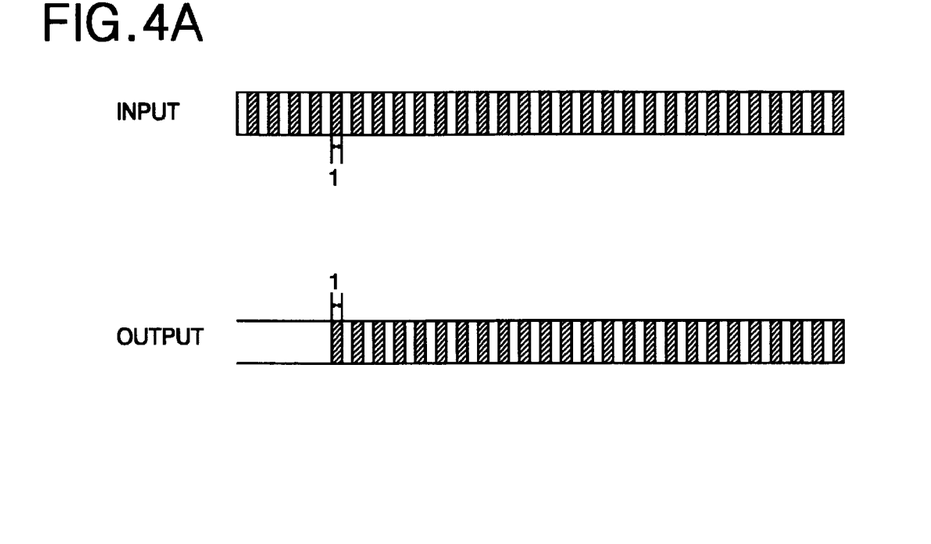
FIGS. 4A and 4B are wave form diagrams illustrating a decoding operation of the video data run length decoding apparatus of FIG. 3.
Figure 4B:
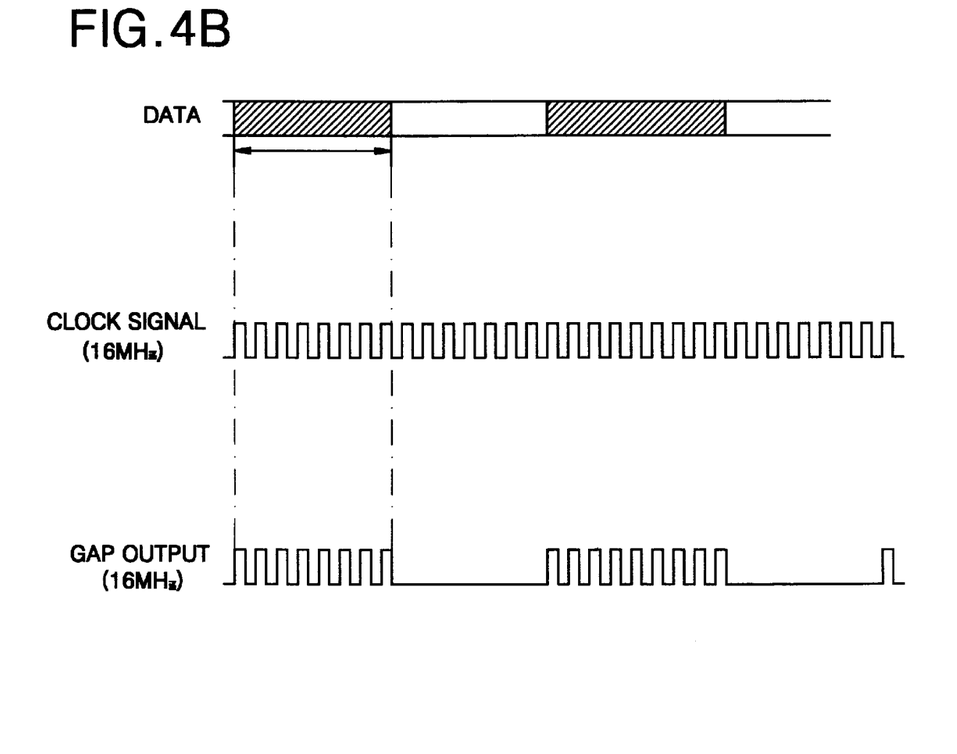

FIGS. 4A and 4B are decoding operation timing diagrams.

FIG. 4A illustrates a data stream on the pipeline which is configured so that an interval in which there is a data and another interval in which there is not a data are alternately formed. In the drawing, "1" represents the interval in which there is a data.

FIG. 4B illustrates the detailed data stream of FIG. 4A. As shown therein, the data is read while the gap clock signal is a high level 8-clock signal in the run length decoding input register, and the data is not read while the gap clock signal is a low level 8-clock signal for thereby alternately forming the intervals.

Figure 5:
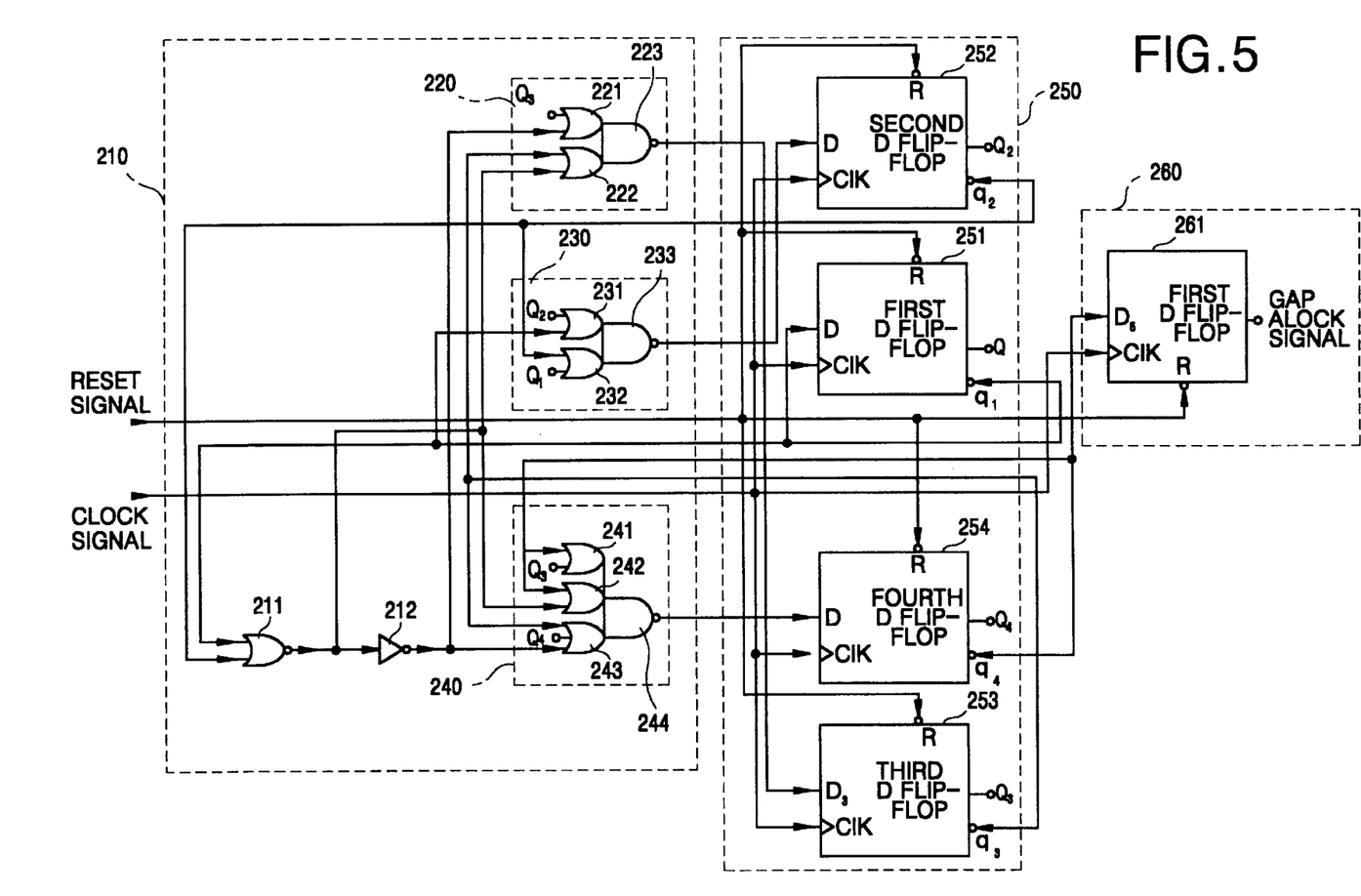
FIG. 5 is a circuit diagram illustrating the gap clock signal generator of FIG. 3 according to the present invention.

FIG. 5 illustrates the gap clock signal generator 200 of FIG. 3 which includes a logic circuit 210 having three logic units, a NOR gate and an inverter for thereby synchronizing the value of the counter based on an ORing and ANDing operation, a delay unit 250 having four D flip-flop units for delaying and outputting an output signal from the logic circuit 210 and feeding-back the thusly outputted signal to the logic circuit 210, and a determination unit 260 for delaying the output signal from the delay unit 250 by one clock cycle and finally outputting a 16-digit gap clock signal.

The operation of the gap clock signal generator 200 will be explained.

First, the first, second, third and fourth D flip-flop units 251, 252, 253 and 254 of the delay unit 250 are reset in accordance with a reset signal and output two different signals based on the clock signal. The thusly outputted signals are inputted into the logic circuit 210. The output signals $Q_1$ and $Q_2$ outputted from the first and second D flip-flop units are inputted into the second logic unit 230 of the logic circuit 210, and the output signal $Q_3$ from the third D flip-flop unit is inputted into the first and third logic units 220 and 240, respectively. The output signal $Q_4$ from the fourth D flip-flop unit is inputted into the third logic unit

240. The output signals $q_1$ and $q_2$ from the first and second D flip-flop units are inputted into the second circuit unit 230 and the NOR gate 211 of the logic circuit 210. The NOR gate 211 ORs the inputted signals $q_1$ and $q_2$, and the signal outputted from the NOR gate 211 is inputted into the third logic unit 240 and the inverter 212, respectively. The inverter 212 inverts the inputted signal and outputs the same and the signal outputted from the inverter 212 is inputted into the first logic unit 220 and the third logic unit 240, respectively.

In the first logic unit 220 having two OR-gates and one NAND-gate, the first OR-gate 221 ORs the output signal from the inverter and the output signal $Q_3$ from the third D flip-flop unit 253, and the second OR-gate 222 ORs the output signal from the NOR-gate 211 and the output signal $q_3$ from the third D flip-flop unit, and the first NAND-gate 223 NANDs the output signals from the first and second OR-gates 221 and 222 and outputs to the input terminal $D_3$ of the third D flip-flop unit 253.

In the second logic unit 230 having two OR-gates and one NAND-gate, the third OR-gate 231 ORs the output signal $Q_2$ from the second D flip-flop unit 252 and the output signal $q_1$ from the first D flip-flop unit 251, and the fourth OR-gate 232 ORs the output signals $q_2$ from the second D flip-flop unit 252 and the output signal $Q_1$ from the first D flip-flop unit 251, and the second NAND-gate 233 NANDs the output signals from the third and fourth OR-gates 231 and 232 and outputs the resultant value to the second D flip-flop unit 252.

In the third logic unit 240 having three OR-gates and one NAND-gate, the fifth OR-gate 241 ORs the output signal $q_4$ from the fourth D flip-flop unit 254 and the output signal $Q_3$ from the third D flip-flop unit 253, and the sixth OR-gate 242 ORs the output signal $q_4$ from the fourth D flip-flop unit 254 and the output signal from the NOR-gate 211, and the seventh OR-gate 243 ORs the output signal $Q_4$ from the fourth D flip-flop unit 254 and the output signal from the inverter, and the third NAND-gate 244 NANDs the output signals from the fifth, sixth and seventh OR-gates 241, 242 and 243. In addition, the output signal $q_1$ from the first D flip-flop unit 251 is inputted into the input terminal $D_1$ of the first D flip-flop unit 251. The delay unit 250 delays the output signal from the logic circuit 210, and the signal from the delay unit 250 is inputted into the logic circuit 210. The above-described operations are repeated. The determination unit 260 having one D flip-flop unit receives an output signal $q_4$ from the fourth D flip-flop unit 254 and delays the signal by one clock cycle for thereby outputting a 16-digit gap clock signal.

Figures 6A, 6B, 6C:
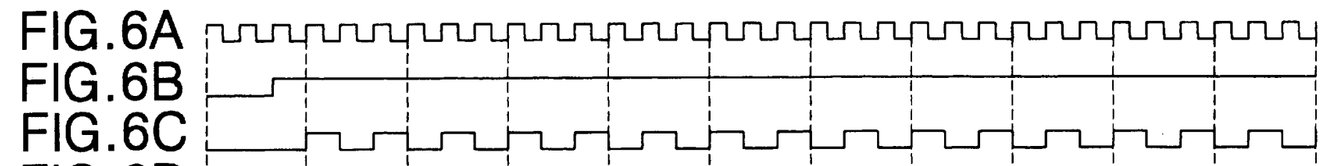
FIGS. 6A through 6G are wave form diagrams illustrating operation timing of the gap clock signal generator of FIG. 5 according to the present invention.
Figure 6D:
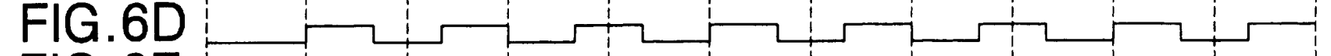
Figure 6E:
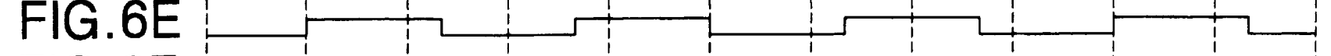
Figure 6F:
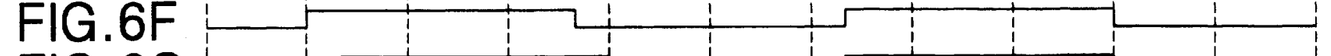
Figure 6G:
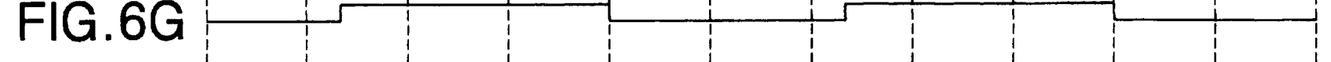

FIGS. 6A through 6G illustrate operation timing diagrams. Of which, FIG. 6A illustrates a clock signal, FIG. 6B illustrates a reset signal, FIG. 6C illustrates an output signal $q_1$ from the first D flip-flop unit 251, FIG. 6D illustrates an output signal $q_2$ from the second D flip-flop unit 252, FIG. 6E illustrates an output signal $q_3$ from the third D flip-flop unit 253, FIG. 6F illustrates an output signal $q_4$ from the fourth D flip-flop unit 254, and FIG. 6G illustrates a gap clock signal from the determination unit 260.

The signal as shown in FIG. 6C is reset by a reset signal and repeatedly has high and low levels only when the clock signal as shown in FIG. 6A is on a rising edge, and the signal as shown in FIG. 6D is reset by the reset signal as shown in FIG. 6B and repeatedly has high and low levels only when the signal as shown in FIG. 6C is on a rising edge, and the signal as shown in FIG. 6E is reset by the reset signal as shown in FIG. 6B and repeatedly has high and low levels only when the signal as shown in FIG. 6D is on a rising edge.

In addition, the signal as shown in FIG. 6F is reset by the reset signal as shown in FIG. 6B and repeatedly has high and low levels only when the signal as shown in FIG. 6E is on a rising edge, and the signal as shown in FIG. 6G is reset by the reset signal as shown in FIG. 6B and delays the signal as shown in FIG. 6F by one clock cycle.

As described above, the video data run length decoding apparatus according to the present invention is capable of decreasing the number of gates by 50% using the gap clock signal compared to the conventional decoding apparatus. In addition, since the buffer is not used, the high speed system is implemented.

In addition, the gap clock signal generator capable of alternately generating an interval in which there is a data and another interval in which there is not a data is used. Therefore, since the data is not inputted while the two dimensional video data is processed by the reverse discrete cosine converter, the memory is not used, so that the number of the gates of the decoding apparatus is decreased for thereby implementing a high speed system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A video data decoding apparatus using a run length when transmitting a video data, comprising:

a first decoder for decoding coded video data;

a reverse zig zag and dequantizing converter for processing the data from the first decoder based on reverse zig zag and dequantization operations; and a reverse discrete cosine converter for processing the data outputted from the reverse zig zag and dequantizing converter, two times, based on reverse discrete cosine conversion and outputting a two-dimensional video data;

wherein said first decoder analyzes a run value of a coded video data, generates the run value, and alternatively outputs an interval of a 8-clock signal in which there are data and another interval of the 8-clock signal in which there is no data using a gap clock signal;

wherein said first decoder includes:

a gap clock signal generator for generating the gap clock signal, the gap clock signal being a clock signal fluctuating for a first predetermined interval and not fluctuating for a second predetermined interval alternatively;

a 2:1 multiplexor for preventing new data from being inputted from outside while the gap clock signal is not generated;

a decoding input register for generating a data stream on a pipeline so that data outputted from the 2:1 multiplexor are inputted at a 8-clock signal interval and the data outputted from the 2:1 multiplexor are not inputted at the next 8-clock signal interval using the gap clock signal outputted from the gap clock signal generator; and a second decoder for analyzing the run value having variable values 0 through 63 of the data stream on the pipeline from the decoding input register using the gap clock signal from the gap clock signal generator as a basic clock signal and generating the run value.

2. The apparatus of claim 3, wherein said gap clock signal generator includes:

a logic circuit for synchronizing a value of a counter based on an ORing and ANDing operations;

a delay unit for delaying an output signal from the logic circuit, outputting the delayed signal and feeding back the delayed signal to the logic circuit; and a determination unit for delaying an output signal from the delay unit by one clock signal cycle and outputting a 16-digit gap clock signal.

3. The apparatus of claim 2, wherein said delay unit includes:

a first D flip-flop for being reset in accordance with a reset signal, delaying a clock signal, outputting two different signals ($Q_1$, $q_1$), feeding back the thusly outputted signals to the logic circuit and delaying the value which is ORed and ANDed;

a second D flip-flop for being reset in accordance with a reset signal, delaying a clock signal, outputting two different signals ($Q_2$, $q_2$), feeding back the thusly outputted signals to the logic circuit and delaying the value which is ORed and ANDed;

a third D flip-flop for being reset in accordance with a reset signal, delaying a clock signal, outputting two different signals ($Q_3$, $q_3$), feeding back the thusly outputted signals to the logic circuit and delaying the value which is ORed and ANDed; and a fourth D flip-flop for being reset in accordance with a reset signal, delaying a clock signal, outputting two different signals ($Q_4$, $q_4$), feeding back the thusly outputted signals to the logic circuit and delaying the value which is ORed and ANDed.

4. The apparatus of claim 2, wherein said logic circuit includes:

a NOR-gate for NORing output signals ($q_1$, $q_2$) from the first and second D flip-flops;

an inverter for inverting a signal from the NOR-gate;

a first logic unit for ORing the output signal from the inverter and the output signal ($Q_3$) from the third D flip-flop, ORing the output signal from the NOR-gate and the output signal ($q_3$) from the third D flip-flop, ANDing the ORed signals and outputting to an input terminal ($D_3$) of the third D flip-flop;

a second logic unit for ORing the output signal ($Q_2$) from the second D flip-flop and the output signal ($q_1$) from the first D flip-flop, ORing the output signal ($q_2$) from the second D flip-flop and the output signal ($Q_1$) from the first D flip-flop, ANDing the ORed signals and outputting to an input terminal ($D_2$) of the second D flip-flop; and a third logic unit for ORing the output signal ($q_4$) from the fourth D flip-flop and the output signal ($Q_3$) from the third D flip-flop, ORing the output signal ($q_4$) from the fourth D flip-flop and the output signal from the NOR-gate, ANDing the output signal ($q_3$) from the third D flip-flop, the output signal ($Q_4$) from the fourth D flip-flop and the output signal from the inverter, ANDing the thusly ORed signals and outputting to an input terminal ($D_3$) of the fourth D flip-flop.

5. The apparatus of claim 4, wherein said first logic unit includes:

a first OR-gate for ORing the output signal from the inverter and the output signal ($Q_3$) from the third D flip-flop;

a second OR-gate for ORing the output signal from the NOR-gate and the output signal ($q_3$) from the third D flip-flop; and a first NAND-gate for NANDing the output signals from the first and second OR-gates.

6. The apparatus of claim 4, wherein said second logic unit includes:

a third OR-gate for ORing the output signal ($Q_2$) from the second D flip-flop and the output signal ($q_1$) from the first D flip-flop;

a fourth OR-gate for ORing the output signal ($q_2$) from the second D flip-flop and the output signal ($Q_1$) from the first D flip-flop; and a second NAND-gate for NANDing the output signals from the third and fourth OR-gates.

7. The apparatus of claim 4, wherein said third logic unit includes:

a fifth OR-gate for ORing the output signal ($q_4$) from the fourth D flip-flop and the output signal ($Q_3$) from the third D flip-flop;

a sixth OR-gate for ORing the output signal ($q_4$) from the fourth D flip-flop and the output signal from the NOR-gate; and a seventh OR-gate for ORing the output signal ($q_3$) from the third D flip-flop, the output signal ($Q_4$) from the fourth D flip-flop and the output signal from the inverter; and a third NAND-gate for NANDing the output signals from the fifth, sixth and seventh OR-gates.

8. The apparatus of claim 2, wherein said determination unit includes a fifth D flip-flop for delaying an output signal ($q_4$) from the fourth D flip-flop by one clock cycle and outputting a gap clock signal.

* * * * *

UNITED STATES PATENT AND TRADEMARK OFFICE
CERTIFICATE OF CORRECTION

PATENT NO. : 6,127,952  
DATED : October 3, 2000  
INVENTOR(S) : Park et al

Page 1 of 1

It is certified that error appears in the above-identified patent and that said Letters Patent is hereby corrected as shown below:

<u>Title page, item [54], Column 1,</u>
Line 1, the title: "Video Data Recording Apparatus" should read --
Video Data Decoding Apparatus --

Signed and Sealed this

Fourth Day of September, 2001

*Attest:*

NICHOLAS P. GODICI
*Attesting Officer    Acting Director of the United States Patent and Trademark Office*